(12) United States Patent
Reinhold et al.

(10) Patent No.: US 9,116,707 B2
(45) Date of Patent: Aug. 25, 2015

(54) DEPENDENCY RESOLUTION IN POLYPHASIC MODULES

(75) Inventors: Mark B. Reinhold, Menlo Park, CA (US); Alexander R. Buckley, Cupertino, CA (US); Jonathan J. Gibbons, Mountain View, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 563 days.

(21) Appl. No.: 12/914,499

(22) Filed: Oct. 28, 2010

(65) Prior Publication Data
US 2012/0096433 A1  Apr. 19, 2012

Related U.S. Application Data

(60) Provisional application No. 61/394,022, filed on Oct. 18, 2010.

(51) Int. Cl.
*G06F 9/44* (2006.01)
(52) U.S. Cl.
CPC ... *G06F 8/36* (2013.01); *G06F 8/71* (2013.01)
(58) Field of Classification Search
None
See application file for complete search history.

(56) References Cited

U.S. PATENT DOCUMENTS

| | | | |
|---|---|---|---|
| 6,349,408 B1* | 2/2002 | Smith | 717/174 |
| 7,076,764 B2* | 7/2006 | Kramer | 717/120 |
| 7,197,743 B2* | 3/2007 | Borg et al. | 717/120 |
| 7,434,202 B2* | 10/2008 | Kramer | 717/120 |
| 7,614,040 B2* | 11/2009 | Wagner et al. | 717/120 |
| 7,870,539 B2* | 1/2011 | Wookey | 717/124 |
| 7,895,572 B2* | 2/2011 | Stienhans | 717/120 |
| 7,934,084 B2* | 4/2011 | Sterbenz | 713/1 |
| 8,074,201 B2* | 12/2011 | Ghercioiu et al. | 717/107 |
| 8,276,121 B2* | 9/2012 | Miller et al. | 717/122 |
| 2004/0133875 A1* | 7/2004 | Kramer | 717/101 |
| 2004/0168152 A1* | 8/2004 | Kramer | 717/120 |
| 2004/0261060 A1* | 12/2004 | Haselden et al. | 717/120 |
| 2008/0052676 A1* | 2/2008 | Wookey | 717/120 |
| 2008/0127076 A1* | 5/2008 | McArdle | 717/120 |
| 2008/0320460 A1* | 12/2008 | Miller et al. | 717/162 |
| 2009/0300151 A1* | 12/2009 | Friedman et al. | 709/222 |
| 2010/0169863 A1* | 7/2010 | Adams | 717/120 |
| 2011/0016447 A1* | 1/2011 | Goel et al. | 717/101 |

\* cited by examiner

*Primary Examiner* — Lewis A Bullock, Jr.
*Assistant Examiner* — Christine Dang
(74) *Attorney, Agent, or Firm* — Park, Vaughan, Fleming & Dowler LLP; Chia-Hsin Suen

(57) ABSTRACT

Some embodiments provide a system that facilitates the development, maintenance, and execution of a software program. During operation, the system obtains a module declaration for a module to be used in the software program. Next, the system resolves one or more dependencies of the module using the module declaration and a list of available modules for the software program. Finally, the system uses the resolved dependencies to manage the software program throughout the life cycle of the software program.

20 Claims, 8 Drawing Sheets

DEPENDENCY RESOLUTION IN POLYPHASIC MODULES

RELATED APPLICATION

This application hereby claims priority under 35 U.S.C. §119 to U.S. Provisional Application No. 61/394,022, entitled "Dependency Resolution in Polyphasic Modules," by Mark B. Reinhold, Alexander R. Buckley and Jonathan J. Gibbons filed on 18 Oct. 2010.

The subject matter of this application is related to the subject matter in a co-pending non-provisional application by inventors Mark B. Reinhold, Alexander R. Buckley, Jonathan J. Gibbons, and Karen M P Kinnear entitled "Polyphasic Modules for Software Development," having Ser. No. 12/771,121, and filed on 30 Apr. 2010.

The subject matter of this application is related to the subject matter in a co-pending non-provisional application by inventors Alexander R. Buckley, Mark B. Reinhold, and Karen M P Kinnear, entitled "Access Control in Modules for Software Development," having Ser. No. 12/771,654, and filed on 30 Apr. 2010.

The subject matter of this application is also related to the subject matter in a co-pending non-provisional application by inventors Jonathan J. Gibbons, Alexander R. Buckley, and Mark B. Reinhold, entitled "Compile-Time Management of Polyphasic Modules," having Ser. No. 12/823,918, and filed on 25 Jun. 2010.

BACKGROUND

1. Field

The present embodiments relate to module-based systems for software development. More specifically, the present embodiments relate to techniques for resolving dependencies among polyphasic modules.

2. Related Art

Within software systems, increasing sophistication and functionality are typically accompanied by corresponding increases in code size and complexity. For example, the addition of new features to a software program may require the implementation of new components, which in turn may increase the number of dependencies within the software program. Over time, changes to the software program may lead to increases in defects, debugging time, redundancy, and lack of readability. The continued development of a software system without effective complexity management may consequently reduce performance and increase maintenance risk to the point of rendering the software system unusable and/or unmanageable.

Issues associated with increasing software complexity may be mitigated by modularizing software systems. Modular software utilizes components that are self-contained and that facilitate a separation of concerns. For example, individual modules may be developed, tested, and used independently of one another in a software system. In addition, a module's functionality and dependencies may be explicitly declared through an interface provided by the module. Modularized software may thus be significantly more maintainable, easier to understand, and less complex than monolithic software.

Hence, increased use of modularity may improve the design, maintenance, performance, scalability, and growth of software systems.

SUMMARY

Some embodiments provide a system that facilitates the development, maintenance, and execution of a software program. During operation, the system obtains a module declaration for a module to be used in the software program. Next, the system resolves one or more dependencies of the module using the module declaration and a list of available modules for the software program. Finally, the system uses the resolved dependencies to manage the software program throughout the life cycle of the software program.

In some embodiments, resolving the dependencies using the module declaration and the available modules involves:
(i) obtaining a dependency from the module declaration;
(ii) obtaining a subset of the available modules matching the dependency; and
(iii) resolving the dependency by analyzing additional dependencies of a first module from the subset of the available modules, and selecting the first module for use in the software program if the additional dependencies of the first module are resolved using the available modules.

In some embodiments, if the additional dependencies of the first module are not resolved using the available modules, the dependency is further resolved by:
(i) analyzing additional dependencies of a second module from the subset of the available modules, wherein a version associated with the second module precedes a version associated with the first module; and
(ii) selecting the second module for use in the software program if the additional dependencies of the second module are resolved using the available modules.

In some embodiments, the additional dependencies are associated with at least one of a name, a version, and a reverse dependency constraint.

In some embodiments, the subset of the available modules is obtained using at least one of a directory hierarchy for the software program and a library.

In some embodiments, enabling execution of the software program using the resolved dependencies involves:
(i) using one or more local dependencies associated with the resolved dependencies to identify a set of locally connected modules to be used in the software program;
(ii) creating an execution context containing the locally connected modules; and
(iii) using the execution context to execute the software program.

In some embodiments, creating the execution context containing the locally connected modules involves selecting a dominant class from a set of identically named classes in the execution context, and exposing the dominant class to other execution contexts associated with the software program.

In some embodiments, using the execution context to execute the software program involves managing the defining and importing of packages by the execution context and other execution contexts associated with the software program.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
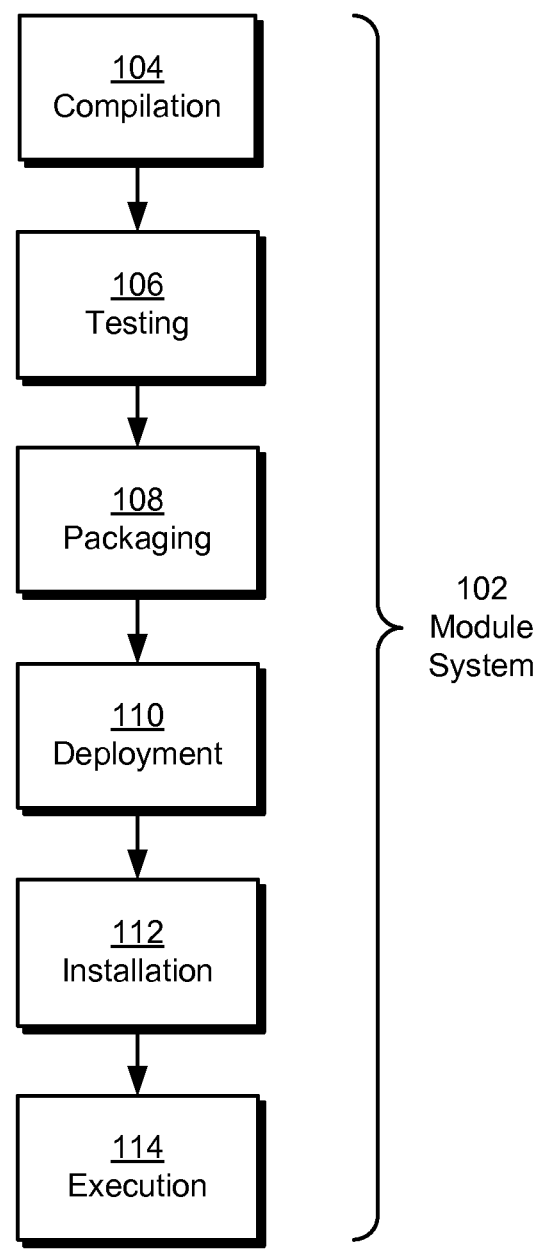
FIG. 1 shows the life cycle of a software program in accordance with an embodiment.

FIG. 1 shows the life cycle of a software program in accordance with an embodiment. The life cycle begins with a compilation 104 phase, in which source code for the software program is converted into an executable format. Next, the compiled software program undergoes a testing 106 phase to detect failures, defects, and/or other issues in the implementation of the software program. For example, testing 106 may be carried out to analyze the correctness, security, scalability, performance, maintainability, and/or usability of the software program.

After testing 106, packaging 108 of the software program may involve creating a software package in an archive format from the software program's executable code. The software package may then undergo deployment 110 and installation 112 on a computer system. For example, a web application may be deployed and installed on a server computer, while a native application may be deployed and installed on multiple personal computers. Finally, execution 114 of the software program allows the software program's intended functionality to be provided to an end user.

Those skilled in the art will appreciate that changes such as patches, upgrades, maintenance, and/or new releases may be periodically made to the software program. Moreover, such changes may be propagated through some or all of the phases of the life cycle. For example, the addition of new features to the software program may require that the software program be recompiled, tested, packaged, deployed, installed, and executed with the new features.

Those skilled in the art will also appreciate that changes to the software program may increase the complexity of the software program, which may eventually interfere with the maintainability, usability, and/or performance of the software program. For example, modifications to the software program may be difficult to document and/or track across all phases 104-114 of the software program's life cycle. Over time, such modifications may interfere with the continued use and development of the software program by obscuring the design of the software program, increasing redundancy, and introducing new, unknown dependencies among components in the software program.

To mitigate issues associated with increased software complexity, a module system 102 may be used to facilitate the development and maintenance of the software program. In one or more embodiments, module system 102 uses modular information at all phases 104-114 of the life cycle to manage dependencies in the software program. Such polyphasic modularization may facilitate the development of the software program by improving transparency, cohesion, performance, scalability, and maintainability in the software program.

Management of polyphasic modules is discussed in a co-pending non-provisional application by inventors Mark B. Reinhold, Alexander R. Buckley, Jonathan J. Gibbons, and Karen M P Kinnear, entitled "Polyphasic Modules for Software Development," having Ser. No. 12/771,121, and filed on 30 Apr. 2010, which is incorporated herein by reference.

Figure 2:
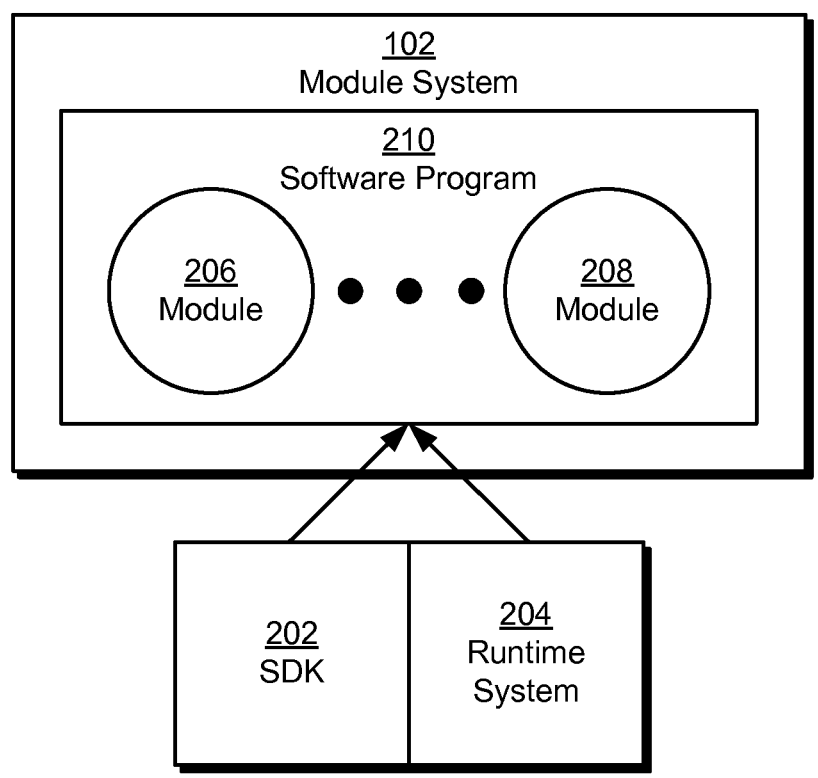
FIG. 2 shows the development and maintenance of a software program using a module system in accordance with an embodiment.

FIG. 2 shows the development and maintenance of a software program 210 using module system 102 in accordance with an embodiment. As shown in FIG. 2, a software development kit (SDK) 202 and a runtime system 204 may interact with module system 102 to manage software program 210 across all stages of the life cycle of software program 210. For example, SDK 202 and runtime system 204 may correspond to the Java (Java™ is a registered trademark of Oracle America, Inc.) Development Kit (JDK) and Java Runtime Environment (JRE).

As mentioned above, module system 102 may use polyphasic modules to facilitate the development of software program 210. In particular, polyphasic modularization of software program 210 may begin with the creation of module declarations for a set of modules 206-208 to be used in software program 210.

In one or more embodiments, modules 206-208 correspond to standalone components in software program 210 that may be independently programmed, tested, and modified. Each module 206-208 may be defined, organized, and used through a corresponding module identity and module declaration. In addition, an interface to a module may be based on the members of the module. For example, the module may be accessed through public methods and/or data in the module's members. Logical boundaries between modules 206-208 may further be enforced by enabling inter-module interaction only through the interfaces to the modules, thus effectively hiding implementation details of modules 206-208 from one another.

In other words, modules 206-208 may correspond to encapsulated abstractions of functionality in software program 210 with well-defined capabilities and dependencies. Modules 206-208 may thus provide a large amount of flexibility in organizing the structure of software program 210. For example, Java classes may be grouped into modules 206-208 based on the functionality and/or use of the classes in software program 210 instead of language-based constraints such as package membership.

In one or more embodiments, module declarations for modules 206-208 are obtained separately from source code for software program 210. For example, module declarations for modules 206-208 in a Java program may be stored in module definition files that are separate from source files containing Java classes, interfaces, enumerations, and/or annotation types. Such decoupling of module declarations from module implementations may further enable the creation of modules 206-208 based on factors that facilitate the design and development of software program 210, such as separation of concerns, scalability, and performance.

The independent creation and procurement of module declarations may additionally allow module system 102 to begin modularizing software program 210 before software program 210 is compiled. For example, module system 102 may allow module declarations for modules 206-208 to be created (e.g., using SDK 202) before development of source code for software program 210 is complete. Module system 102 may proceed with using the module declarations to manage dependencies in software program 210 through the compilation, testing, packaging, deployment, installation, and execution phases of the life cycle of software program 210.

More specifically, module declarations for modules 206-208 may be used by SDK 202 and/or runtime system 204 to resolve dependencies in software program 210. First, SDK 202 and/or runtime system 204 may resolve one or more dependencies of a module to be used in software program 210 using the module declaration for the module and a list of available modules for software program 210. Each dependency may be recursively resolved by obtaining a subset of the available modules matching the dependency and analyzing additional dependencies of the subset of the available modules in descending order of version. If each of the additional dependencies is resolved using the available modules, the version of the module associated with the dependencies is selected for use in software program 210. If the additional dependencies are not resolved using the available modules, the additional dependencies of a preceding version of the module are analyzed for potential resolution using the available modules.

SDK 202 and/or runtime system 204 may then use the resolved dependencies to manage software program 210 throughout the lifecycle of software program 210. In particular, SDK 202 and/or runtime system 204 may use one or more local dependencies associated with the resolved dependencies to identify sets of locally connected modules to be used in software program 210 and create execution contexts containing the sets of locally connected modules. SDK 202 and/or runtime system 204 may then use the execution contexts to execute software program 210. For example, SDK 202 and/or runtime system 204 may manage the visibility of classes and/or the defining and importing of packages among the execution contexts.

Figure 3:
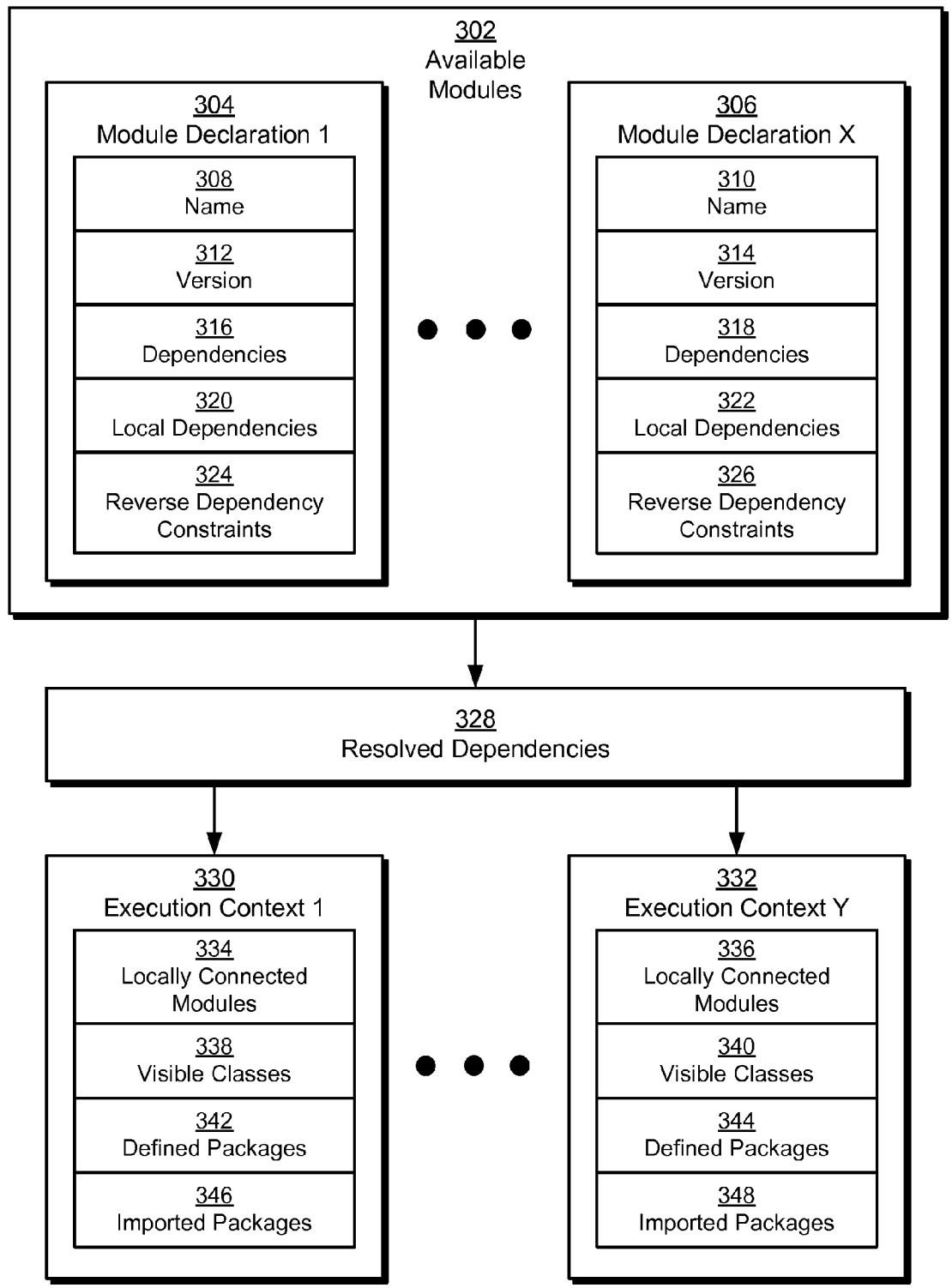
FIG. 3 shows the use of modules in facilitating execution of a software program in accordance with an embodiment.

FIG. 3 shows the use of modules in facilitating the execution of a software program (e.g., software program 210 of FIG. 2) in accordance with an embodiment. As shown in FIG. 3, a set of available modules 302 may be used in the software program. Each module from the available modules 302 may be defined using a module declaration (e.g., module declaration 1 304, module declaration x 306) for the module. Moreover, the module declaration may include a name 308-310, a version 312-314, one or more dependencies 316-318, one or more local dependencies 320-322, and/or one or more reverse dependency constraints 324-326.

In one or more embodiments, module declarations for available modules 302 are used to obtain a set of resolved dependencies 328 in the software program. As described below, resolved dependencies 328 may be based on the dependencies, local dependencies, and/or reverse dependency constraints of available modules 302. In particular, dependency resolution may begin with the module declaration for a module representing an entry point to the software program. For example, the module declaration may define a module to be used in the software program that contains a Java class with a method named "main."

Dependencies and/or local dependencies of the module may then be obtained from the module declaration. In one or more embodiments, each dependency and/or local dependency must be associated with a name and may be associated with a version and/or reverse dependency constraint. For example, a dependency on a module named "M" may be included in the module declaration as "requires M," while a local dependency on a module named "N" with a version of 2.3 or higher may be included in the module declaration as "requires local N @ 2.3+."

To resolve a dependency, local or not, a subset of available modules 302 matching the dependency may be obtained. In one or more embodiments, the subset of available modules 302 is obtained using a directory hierarchy for the software program. For example, available modules 302 may be identified and/or located using the directory hierarchy for the software program; one or more available modules 302 with names and/or versions that match the dependency may then be obtained by searching a list of available modules 302. Use of a directory hierarchy to identify and locate modules is discussed in a co-pending non-provisional application by inventors Jonathan J. Gibbons, Alexander R. Buckley, and Mark B. Reinhold, entitled "Compile-Time Management of Polyphasic Modules," having Ser. No. 12/823,918, and filed on 25 Jun. 2010, which is incorporated herein by reference.

On the other hand, the subset of available modules 302 may be obtained from a library associated with the software program. For example, the library may contain compiled code that may be queried through an Application Programming Interface (API) for modules that match the name and/or version of the dependency.

Those skilled in the art will appreciate that a module in the software program may be associated with a chain of dependencies. In particular, a module that matches a dependency may include additional dependencies, local dependencies, and/or reverse dependency constraints, such that the dependency may be resolved by the module only if the additional dependencies are also resolved using one or more available modules 302. For example, a module named "A" may have a dependency on a module named "B," which has a dependency on a module named "C," which has a dependency on a module named "D." Thus, the dependency of "A" on "B" may be resolved only if the subsequent dependencies of "B" on "C" and "C" on "D" are also resolved.

In one or more embodiments, chains of dependencies in the software program are resolved in a recursive fashion. In other words, matching of dependencies and modules may occur until a connected subset of available modules 302 is selected that resolve one or more chains of dependencies associated with the software program. Moreover, each subset of available modules 302 that matches a dependency may be analyzed in descending order of version, such that the highest version of a module that resolves a dependency and includes additional dependencies that are resolved using available modules 302 is selected for use in the software program.

For example, a module named "X" may contain the entry point to the software program and have a dependency of "Y @ 1.0+." Two modules from available modules 302 may match the dependency and have module identities of "Y @ 1.5" and "Y @ 1.1." The module identified as "Y @ 1.5" may have a dependency of "Z @ [2.0, 3.0)," which may be potentially resolved by three modules with module identities of "Z @ 2.8," "Z @ 2.5," and "Z @ 2.0." On the other hand, the module identified as "Y @ 1.1" does not have any dependencies.

The dependency of "X" on "Y @ 1.0+" may be resolved by first analyzing additional dependencies of the module associated with the highest version that matches the dependency (e.g., "Y @ 1.5"). Because the "Y @ 1.5" module includes an additional dependency of "Z @ [2.0, 3.0)," the module associated with the highest version that matches the additional dependency (e.g., "Z @ 2.8") may also be analyzed. The "Z @ 2.8" module may be selected for use in the software program if dependencies of the "Z @ 2.8" module are resolved using available modules 302. In other words, the "Z @ 2.8" and "Y @ 1.5" modules may resolve the dependency if a chain of dependencies from the "Z @ 2.8" module may also be resolved using available modules 302, or if the "Z @ 2.8" module does not have any dependencies.

If the dependencies of the "Z @ 2.8" module are not resolved using available modules 302, the module associated with the next highest version that matches the additional dependency (e.g., "Z @ 2.5") may be analyzed. The "Z @ 2.5" module may be selected for use in the software program if the dependencies of the "Z @ 2.5" module are resolved using available modules 302, or if the "Z @ 2.5" module has no dependencies. If the dependencies of the "Z @ 2.5" module are not resolved using available modules 302, the "Z @ 2.0" module may be selected for use in the software program if all dependencies of the "Z @ 2.0" module are resolved using available modules 302.

Finally, if the dependency of "Y @ 1.5" on "Z @ [2.0, 3.0)" cannot be resolved using any of the three modules named "Z," the module identified as "Y @ 1.1" may be analyzed. Because "Y @ 1.1" does not have additional dependencies, "Y @ 1.1" may be selected for use in the software program without further analysis. Consequently, the "Y @ 1.1" module may be used to resolve the dependency of "X" on "Y @ 1.0+" only if the chain(s) of dependencies associated with the "Y @ 1.5" module cannot be resolved using available modules 302. Dependency resolution using available modules is discussed in further detail below with respect to FIG. 4A.

Resolved dependencies 328 may then be used to create a set of execution contexts (e.g., execution context 1 330, execution context y 332). In one or more embodiments, the execution contexts are used to simulate the loading of classes in the software program prior to runtime. As a result, each execution context may contain information that is used to execute the software program, including a set of locally connected modules 334-336, a set of visible classes 338-340, a set of defined packages 342-344, and a set of imported packages 346-348.

The information may then be used during runtime of the software program. For example, locally connected modules 334-336, visible classes 338-340, defined packages 342-344, and imported packages 346-348 of execution contexts in a Java program may be used by Java class loaders to manage the loading and visibilities of classes, as discussed below.

In one or more embodiments, locally connected modules 334-336 correspond to sets of modules from resolved dependencies 328 that are connected by local dependencies. For example, a set of locally connected modules may be formed from a module named "A" with a local dependency on a module named "B," which in turn has local dependencies on two modules named "C" and "D." In another example, a set of locally connected modules may contain a single module if the module only has non-local resolved dependencies 328 on other modules. Local dependencies are discussed in a co-pending non-provisional application by inventors Alexander R. Buckley, Mark B. Reinhold, and Karen M. P Kinnear entitled "Access Control in Modules for Software Development," having Ser. No. 12/771,654, and filed on 30 Apr. 2010, which is incorporated herein by reference.

Because each set of locally connected modules 334-336 may require loading by a common loader (e.g., Java class loader) to sidestep runtime errors associated with the loading of split packages, an execution context containing the locally connected modules may be created and mapped to the common loader. For example, execution contexts for a Java program may map to Java class loaders to ensure that each set of locally connected modules in the Java program is loaded by the same class loader. Locally connected modules are discussed in further detail below with respect to FIG. 4B.

Each execution context may also contain information that is used to manage the software program throughout the software program's life cycle. First, the execution context may include classes in defined packages (e.g., defined packages 342-344). Identically named classes may occur in the defined packages of more than one module in a set of locally connected modules, causing inconsistency and/or errors during class loading if the modules are included in the same execution context. For example, an execution context may contain three modules, each defining a public Java class named "Foo.Bar." The execution of the "loadClass" method in a Java class loader to which the execution context maps may potentially result in the loading of any one of the three classes named "Foo."

To reduce inconsistency associated with identically named classes in the same execution context, a dominant class may be selected from the identically named classes in defined packages 342-344 and included in the set of visible classes (e.g., visible classes 338-340). In other words, the dominant class may be exposed (e.g., visible) within the execution context and to other execution contexts, while other classes of the same name may be hidden (e.g., invisible) within the execution context and from the other execution contexts. Furthermore, the dominant class may be selected using a variety of mechanisms. For example, the dominant class may be selected from a module that is closest in a chain of dependencies to the module containing the entry point of the software program, or as the class in a module that is the target of the most dependencies in the software program. Alternatively, the dominant class may be manually selected (e.g., by a developer) if the modules containing the identically named classes cannot be ordered by number of dependencies, proximity to the entry point of the software program, and/or other attributes.

Defined packages 342-344 and imported packages 346-348 may also be used to maintain class space consistency among the execution contexts. Defined packages 342-344 may correspond to packages of classes that are defined within a module of the corresponding execution context. Imported packages 346-348 may correspond to packages of classes that are defined in other execution contexts by modules on which modules 334-336 have resolved dependencies 328. For example, a defined package of an execution context in a Java program may correspond to a package containing classes that have, as a defining loader, a class loader corresponding to the execution context. On the other hand, an imported package of the execution context may correspond to a package containing classes that have, as an initiating loader, the class loader corresponding to the execution context.

In particular, defined packages 342-344 and imported packages 346-348 may enable adherence to a number of constraints that enforce class space consistency among the execution contexts. First, to avoid ambiguity during class loading, an execution context may not define a package from a module within the execution context and import a package of the same name from a module in another execution context. As a result, the same package name may not appear in both the defined packages and the imported packages of the execution context.

Second, to reduce inconsistency associated with identically named packages in different execution contexts, identically named packages may not be defined in two execution contexts if a module in an execution context has, in the transitive closure of resolved dependencies 328, dependencies on modules in both execution contexts. For example, if execution contexts are mapped to Java class loaders, this constraint may prevent runtime errors that occur from the passing of a first object whose class is defined by a first execution context to a second object whose class is defined by a second execution context, then from the second object to a third object whose class is defined by a third execution context that defines a class of the same name as that of the class defined in the first execution context.

Figure 4A:
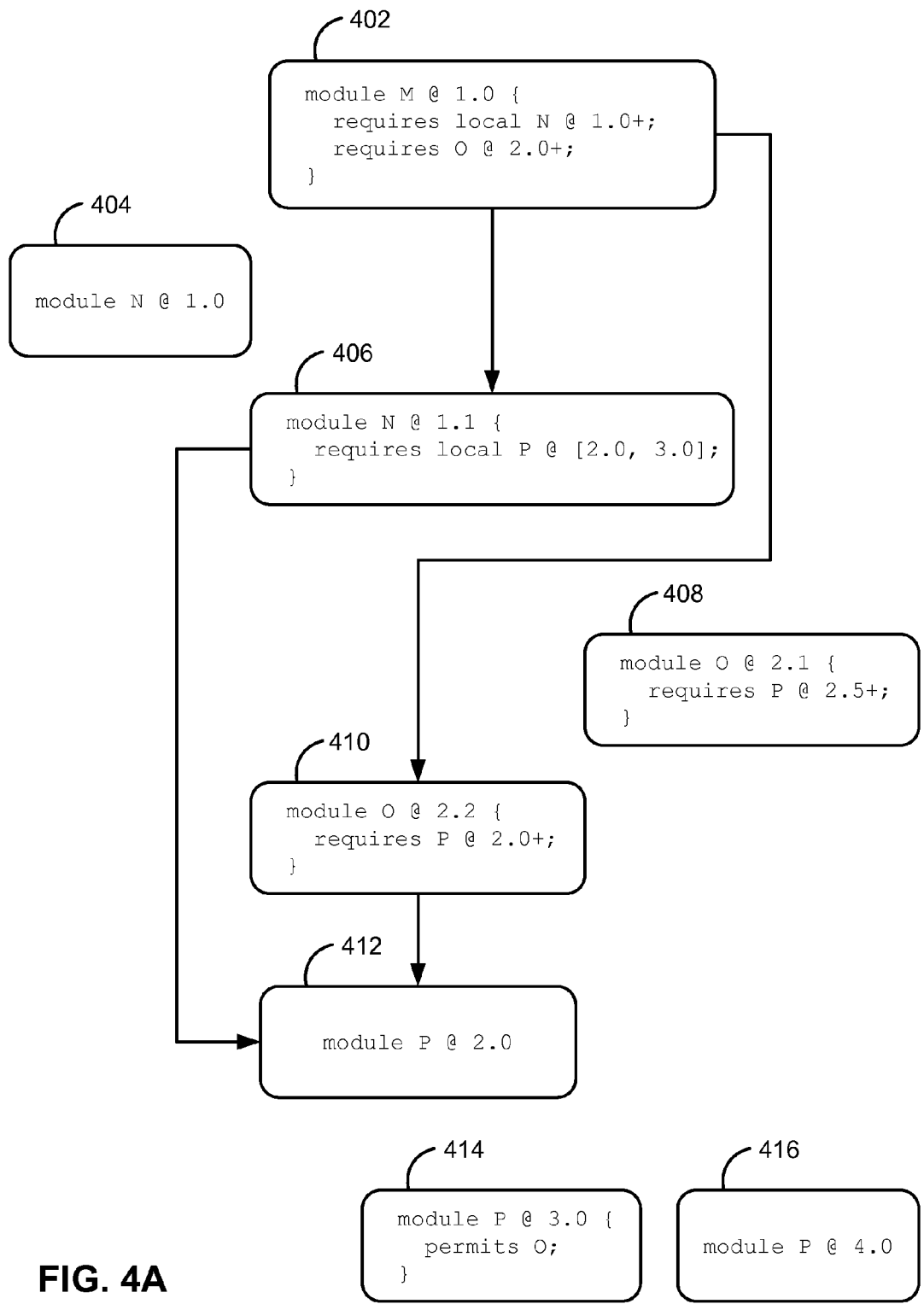
FIG. 4A shows the resolving of dependencies in an exemplary set of modules in accordance with an embodiment.

FIG. 4A shows the resolving of dependencies in an exemplary set of modules 402-416 in accordance with an embodiment. As shown in FIG. 4A, modules 402-416 are associated with module declarations that identify the modules and specify the modules' dependencies. In particular, module 402 includes a name of "M @ 1.0," a local dependency of "N @ 1.0+," and a dependency of "O @ 2.0+." Modules 404-406 both include a name of "N" and respective versions of "1.0" and "1.1," and module 406 contains a local dependency of "P @ [2.0, 3.0]." Modules 408-410 are both named "O" and have versions of "2.1" and "2.2," respectively. Module 408 has a dependency on "P @ 2.5+," and module 410 has a dependency on "P @ 2.0+." Modules 412-416 have a name of "P" and respective versions of "2.0," "3.0," and "4.0," and module 414 has a reverse dependency constraint that allows module 412 to be visible only to modules named "O."

Modules 402-416 may correspond to a set of available modules for a software program, such as software program 210 of FIG. 2. In addition, module 402 may contain the entry point of the software program. As a result, one or more chains of dependencies beginning at module 402 may be resolved to execute the software program.

As discussed above, the dependencies of module 402 may be resolved by obtaining each dependency from the module declaration for module 402 and obtaining a subset of the available modules matching the dependency. One or more modules from the subset of available modules may then be considered for use in the software program and analyzed for additional dependencies in descending order of version. Dependency resolution may continue recursively until a chain of dependencies beginning with the dependency of module 402 is resolved using the available modules 402-416.

Beginning with the first dependency of module 402 (e.g., "requires local N @ 1.0+"), the subset of modules 402-416 matching the dependency may correspond to modules 404-406. Module 406 may then be analyzed for additional dependencies because module 406 is associated with a higher version (e.g., "1.1") than module 404 (e.g., "1.0"). More specifically, module 406 includes a local dependency of "P @ [2.0, 3.0]," which matches modules 412-414 from available modules 402-416. However, module 414 includes a reverse dependency constraint (e.g., "permits O") that prevents module 406 from seeing or using module 414. Consequently, the first dependency of module 402 may be resolved by selecting module 406 and module 412 for use in the software program.

Next, the second dependency of module 402 (e.g., "requires O @ 2.0+") may match modules 408-410. Module 410 may be analyzed for additional dependencies because module 410 is associated with a higher version (e.g., "2.2") than module 408 (e.g., "2.1"). As shown in FIG. 4A, module 410 includes a dependency of "P @ 2.0+," which matches modules 412-416. However, module 412 is selected because module 412 is already used to resolve the dependency of module 406. In other words, a dependency may be resolved using the highest possible version of a module unless a lower version that is already selected for use with the software program also resolves the dependency.

More specifically, dependencies in the software program may be resolved by selecting no more than one version of a module of a given name whenever possible. For example, two different dependencies of "X @ 1.5+" and "X @ [1.0, 2.0]" may be resolved by selecting a single module named "X" with a version of between "1.5" and "2.0" for use in the software program, even if later versions of "X" are available.

Dependency resolution in the software program may thus conclude with the selection of modules 402, 406, 410, and 412 for use in the software program. The resolved dependencies may additionally be stored in a structure such as a graph. For example, a vertex representing a module may be added to the graph once the module is selected for use in the software program. Along the same lines, a directed or undirected edge between two vertices may represent a dependency between the modules represented by the vertices. The completed graph may then be used to identify sets of locally connected modules that are grouped into execution contexts and used to execute the software program, as discussed below with respect to FIG. 4B.

Figure 4B:
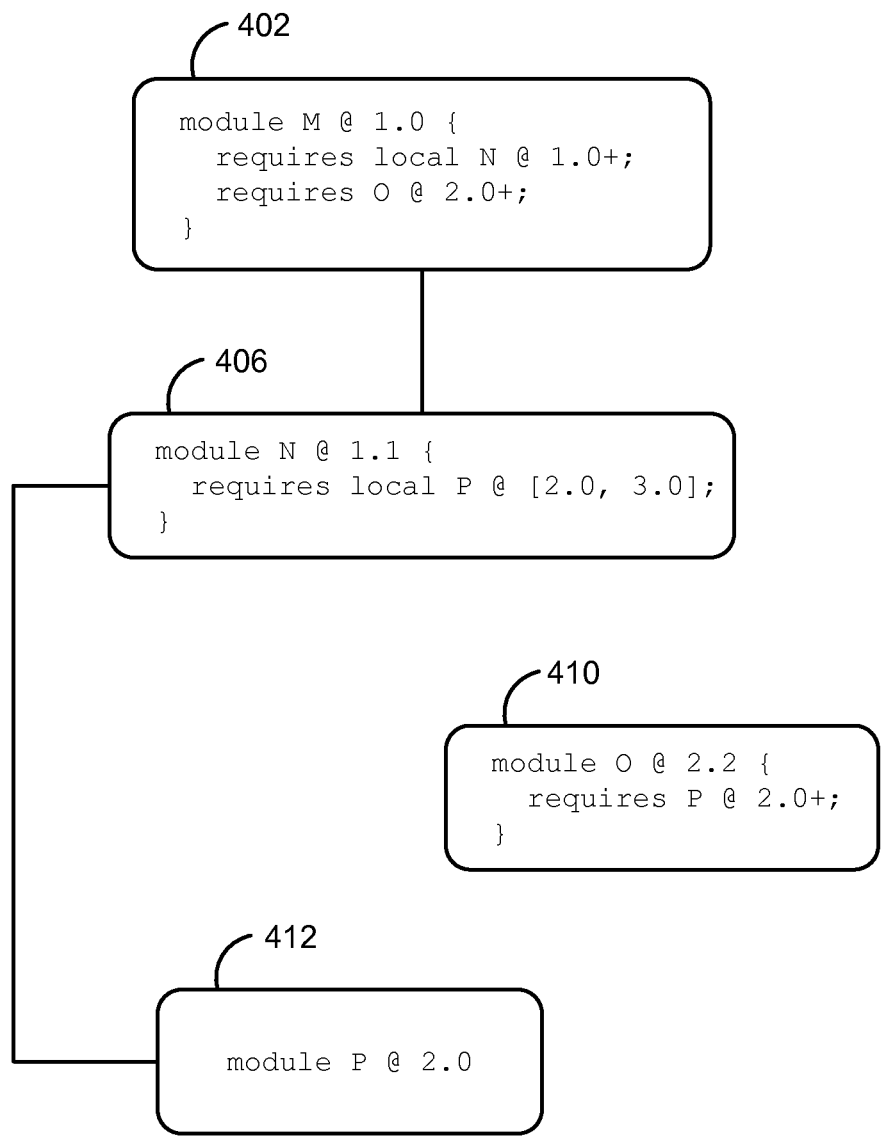
FIG. 4B shows the identification of locally connected modules from a set of resolved dependencies.

FIG. 4B shows the identification of locally connected modules from a set of resolved dependencies. More specifically, FIG. 4B shows a set of modules (e.g., modules 402, 406, 410, and 412) corresponding to resolved dependencies for a software program with an entry point in module 402. The resolved dependencies may be stored in a structure such as a graph. In addition, the structure may include information regarding local dependencies. For example, a graph of resolved dependencies for the software program may use two different types of edges (e.g., directed and undirected) to differentiate between dependencies and local dependencies.

As mentioned previously, modules connected by local dependencies may require loading by a common loader (e.g., Java class loader) to sidestep runtime errors associated with the loading of split packages. Such locally connected modules may be identified from the resolved dependencies of FIG. 4B and used to create an execution context that is mapped to the common loader. For example, the locally connected modules may correspond to connected components of a graph with vertices representing the selected modules and undirected edges representing local dependencies connecting the modules.

In other words, locally connected components may be identified from the resolved dependencies using techniques for identifying connected components in graphs. For example, a technique may begin with module 402 and identify a set of locally connected modules that includes modules 402, 406, and 412. The technique may then identify module 410 as the sole element of a different set of locally connected modules. Two execution contexts may then be created and used to execute the software program; one execution context may contain modules 402, 406, and 412, and the other execution context may contain module 410.

As discussed above, the execution contexts may also include mechanisms and/or information for maintaining class space consistency. First, a dominant class may be selected from a set of identically named classes in an execution context. For example, modules 402, 406, and 412 may each include a class named "Foo.Bar." To prevent inconsistency with loading of the "Foo.Bar" class in the execution context containing modules 402, 406, and 412, the dominant "Foo.Bar" class may be selected from the module upon which the largest number of modules have a direct or indirect dependency (e.g., module 412) or the module that is closest to the entry point of the software program (e.g., module 402).

Similarly, an execution context may not define a package from a module within the execution context and import a package of the same name from a module in another execution context. For example, if a package named "Foo.Bar" is defined in module 406, the package is also defined for the execution context containing modules 402, 406, and 412. Moreover, the resolved dependency of module 402 on module 410 in another execution context may prevent package "Foo.Bar" from being defined in module 410.

Finally, identically named packages may not be defined in two execution contexts if a unique execution context contains a module with transitive resolved dependencies on modules in both execution contexts. Continuing with the above example, if module 402 has a non-local dependency on N @ 1.0+, three execution contexts may exist (e.g., one with module 402, one with modules 406 and 412, and one with module 410) and the execution context containing modules 406 and 412 may be unable to define the same package as the execution context containing module 410.

Figure 5:
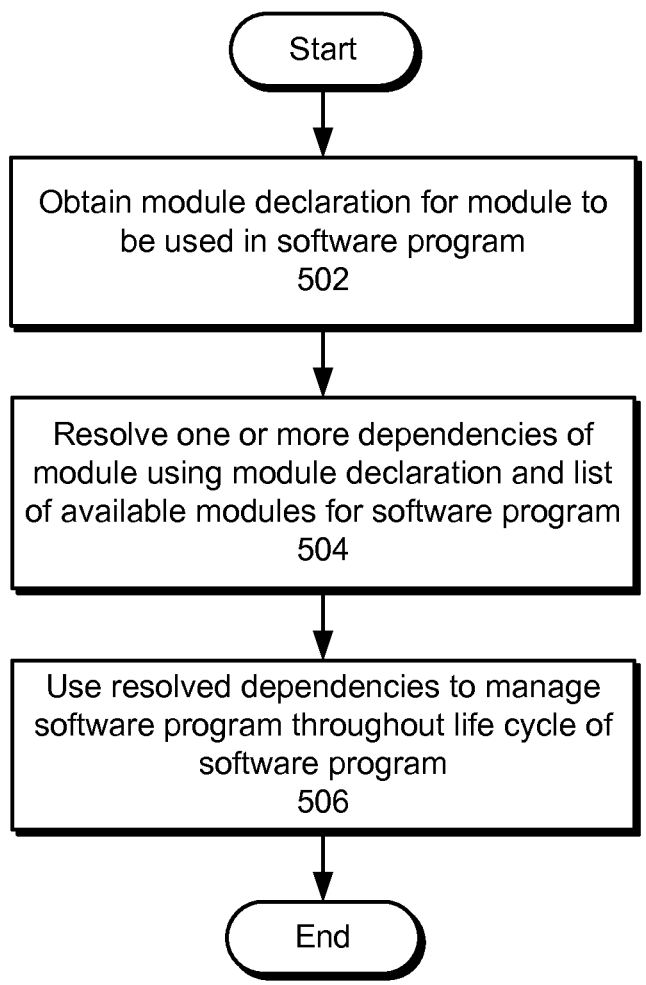
FIG. 5 shows a flowchart illustrating the process of facilitating the execution of a software program in accordance with an embodiment.

FIG. 5 shows a flowchart illustrating the process of facilitating the execution of a software program in accordance with an embodiment. In one or more embodiments, one or more of the steps may be omitted, repeated, and/or performed in a different order. Accordingly, the specific arrangement of steps shown in FIG. 5 should not be construed as limiting the scope of the embodiments.

Initially, a module declaration for a module to be used in the software program is obtained (operation 502). For example, a module declaration for a module in a Java program may be obtained from a module definition file (e.g., module compilation unit, manifest file, etc.) in the module directory corresponding to the module. The module declaration may include one or more dependencies, local dependencies, and/or reverse dependency constraints associated with the module.

Next, one or more dependencies of the module are resolved using the module declaration and a list of available modules for the software program (operation 504). Dependency resolution using available modules and module declarations is discussed in further detail below with respect to FIG. 6. Finally, the resolved dependencies are used to manage the software program throughout the life cycle of the software program (operation 506). For example, local dependencies from the resolved dependencies may be used to identify sets of locally connected modules in the software program. The locally connected contexts may then be grouped using execution contexts, and the execution contexts may be used to execute the software program.

Figure 6:
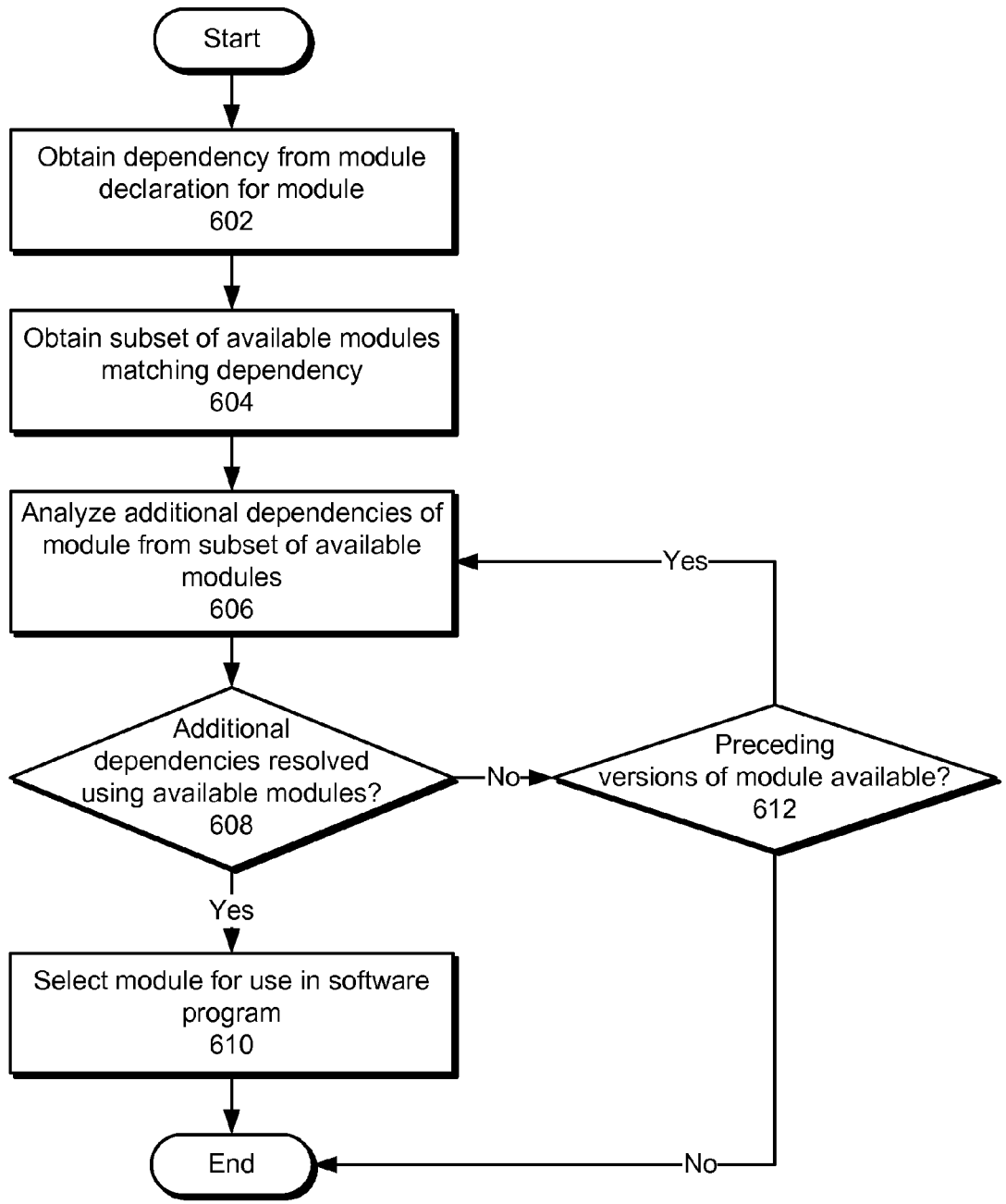
FIG. 6 shows a flowchart illustrating the process of resolving dependencies of a module in accordance with an embodiment.

In addition, the resolved dependencies may be used during all phases of the life cycle of the software program. For example, the resolved dependencies may be used to select modules for compilation and execution. Similarly, the resolved dependencies may allow modules in the same execution context to be deployed in the same library. Such polyphasic, module-based dependency resolution may thus increase transparency, cohesion, performance, scalability, and maintainability in the software program FIG. 6 shows a flowchart illustrating the process of resolving dependencies of a module in accordance with an embodiment. In one or more embodiments, one or more of the steps may be omitted, repeated, and/or performed in a different order. Accordingly, the specific arrangement of steps shown in FIG. 6 should not be construed as limiting the scope of the embodiments.

First, a dependency is obtained from a module declaration for the module (operation 602). The dependency may be local or non-local and indicate that the module requires the functionality of one or more other modules. Next, a subset of available modules matching the dependency is obtained (operation 604). The subset of available modules may be obtained using a directory hierarchy for the software program and/or a library.

Additional dependencies of a module from the subset of available modules may also be analyzed (operation 606). In particular, the subset of available modules may be analyzed in decreasing order of version, so that the highest version from the subset of available modules with resolved dependencies may be selected for use in the software program. Beginning with the most recent version of the subset of available modules, if the additional dependencies are resolved using the available modules (operation 608), the module is selected for use in the software program (operation 610).

However, if one or more additional dependencies (e.g., reverse dependency constraints, dependencies, local dependencies, etc.) associated with the module under analysis cannot be resolved using the available modules and preceding versions of the module are available (operation 612), the additional dependencies of the next highest version of the subset of available modules may be analyzed (operation 606).

Operations 602-612 may be repeated in a recursive manner until all dependencies in the software program are resolved. For example, operations 602-612 may be executed at each level of each chain of dependencies in the software program, beginning with the module containing the entry point of the software program, until the chain of dependencies reaches a module that has no dependencies.

Figure 7:
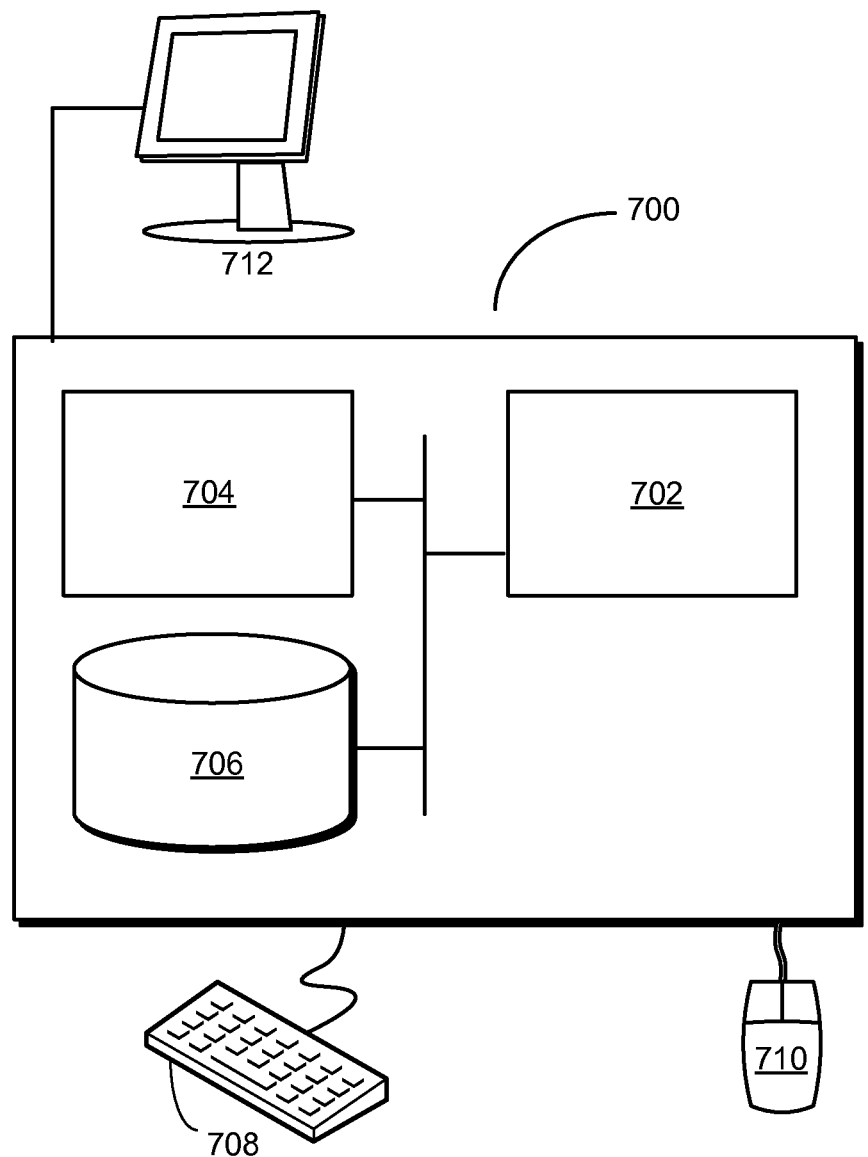
FIG. 7 shows a computer system in accordance with an embodiment.

FIG. 7 shows a computer system 700 in accordance with an embodiment. Computer system 700 includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for facilitating the execution of a software program. The system may include an SDK and a runtime system. The SDK and runtime system may obtain a module declaration of a module to be used in the software program. The SDK and runtime system may also resolve one or more dependencies of the module using the module declaration and a list of available modules for the software program. The SDK and runtime system may then use the resolved dependencies to manage the software program throughout the life cycle of the software program.

In addition, one or more components of computer system 700 may be remotely located and connected to the other components over a network. Portions of the present embodiments (e.g., SDK, runtime system, etc.) may also be located on different nodes of a distributed system that implements the embodiments. For example, the present embodiments may be implemented using a cloud computing system that provides a module system for managing the life cycles of software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the development, maintenance, and execution of a software program, comprising:
   obtaining a module declaration for a module to be used in the software program;
   resolving one or more dependencies of the module using the module declaration and a list of available modules for the software program; and
   using one or more local dependencies associated with the resolved dependencies to identify a set of locally connected modules to be used in the software program, wherein the set of locally connected modules are loaded by a single class loader;
   creating an execution context containing the set of locally connected modules, wherein creating the execution context containing the locally connected modules involves:
      selecting a dominant class from a set of identically named classes in the execution context; and
      exposing the dominant class to other execution contexts associated with the software program; and
   using the execution context to execute the software program.

2. The computer-implemented method of claim 1, wherein resolving the dependencies using the module declaration and the available modules involves:
   obtaining a dependency from the module declaration;
   obtaining a subset of the available modules matching the dependency; and
   resolving the dependency by:
      analyzing additional dependencies of a first module from the subset of the available modules; and
      selecting the first module for use in the software program if the additional dependencies of the first module are resolved using the available modules.

3. The computer-implemented method of claim 2, wherein if the additional dependencies of the first module are not resolved using the available modules, the dependency is further resolved by:
   analyzing additional dependencies of a second module from the subset of the available modules, wherein a version associated with the second module precedes a version associated with the first module; and
   selecting the second module for use in the software program if the additional dependencies of the second module are resolved using the available modules.

4. The computer-implemented method of claim 2, wherein the dependency and the additional dependencies are associated with at least one of a name, a version, and a reverse dependency constraint.

5. The computer-implemented method of claim 2, wherein the subset of the available modules is obtained using at least one of a directory hierarchy for the software program and a library.

6. The computer-implemented method of claim 1, wherein using the execution context to execute the software program involves:
   managing defining and importing of packages by the execution context and other execution contexts associated with the software program.

7. A system for facilitating the development, maintenance, and execution of a software program, comprising:
   a software development kit (SDK) for the software program; and
   a runtime system for the software program,
   wherein the SDK and the runtime system are configured to:
      obtain a module declaration for a module to be used in the software program;
      resolve one or more dependencies of the module using the module declaration and a list of available modules for the software program; and
      use one or more local dependencies associated with the resolved dependencies to identify a set of locally connected modules to be used in the software program, wherein the set of locally connected modules are loaded by a single class loader;
      create an execution context containing the set of locally connected modules, wherein creating the execution context containing the locally connected modules involves:
         selecting a dominant class from a set of identically named classes in the execution context; and
         exposing the dominant class to other execution contexts associated with the software program;
      using the execution context to execute the software program.

8. The system of claim 7, wherein resolving the dependencies using the module declaration and the available modules involves:
   obtaining a dependency from the module declaration;
   obtaining a subset of the available modules matching the dependency; and
   resolving the dependency by:
      analyzing additional dependencies of a first module from the subset of the available modules; and
      selecting the first module for use in the software program if the additional dependencies of the first module are resolved using the available modules.

9. The system of claim 8, wherein if the additional dependencies of the first module are not resolved using the available modules, the dependency is further resolved by:

analyzing additional dependencies of a second module from the subset of the available modules, wherein a version associated with the second module precedes a version associated with the first module; and selecting the second module for use in the software program if the additional dependencies of the second module are resolved using the available modules.

10. The system of claim 8, wherein the dependency and the additional dependencies are associated with at least one of a name, a version, and a reverse dependency constraint.

11. The system of claim 7, wherein using the execution context to execute the software program involves:

managing defining and importing of packages by the execution context and other execution contexts associated with the software program.

12. A non-transitory computer-readable storage medium storing instructions that when executed by a computer cause the computer to perform a method for facilitating the development, maintenance, and execution of a software program, the method comprising:

obtaining a module declaration for a module to be used in the software program;

resolving one or more dependencies of the module using the module declaration and a list of available modules for the software program; and using one or more local dependencies associated with the resolved dependencies to identify a set of locally connected modules to be used in the software program, wherein the set of locally connected modules are loaded by a single class loader;

creating an execution context containing the set of locally connected modules, wherein creating the execution context containing the locally connected modules involves:

selecting a dominant class from a set of identically named classes in the execution context; and exposing the dominant class to other execution contexts associated with the software program; and using the execution context to execute the software program.

13. The non-transitory computer-readable storage medium of claim 12, wherein resolving the dependencies using the module declaration and the available modules involves:

obtaining a dependency from the module declaration;

obtaining a subset of the available modules matching the dependency; and resolving the dependency by:

analyzing additional dependencies of a first module from the subset of the available modules;

selecting the first module for use in the software program if the additional dependencies of the first module are resolved using the available modules;

if the additional dependencies of the first module are not resolved using the available modules, analyzing additional dependencies of a second module from the subset of the available modules, wherein a version associated with the second module precedes a version associated with the first module; and selecting the second module for use in the software program if the additional dependencies of the second module are resolved using the available modules.

14. The non-transitory computer-readable storage medium of claim 12, wherein using the execution context to execute the software program involves:

managing defining and importing of packages by the execution context and other execution contexts associated with the software program.

15. The computer-implemented method of claim 1, wherein the dominant class is selected from a second module that is closest in a chain of dependencies to a third module containing an entry point of the software program.

16. The computer-implemented method of claim 1, wherein the dominant class is selected from a second module that is depended upon by a highest number of other modules in the software program.

17. The computer-implemented 1, wherein the dominant class is manually selected.

18. The non-transitory computer-readable storage medium of claim 13, wherein the dependency and the additional dependencies are associated with at least one of a name, a version, and a reverse dependency constraint.

19. The non-transitory computer-readable storage medium of claim 13, wherein the subset of the available modules is obtained using at least one of a directory hierarchy for the software program and a library.

20. The non-transitory computer-readable storage medium of claim 12, wherein using the execution context to execute the software program involves:

managing defining and importing of packages by the execution context and other execution contexts associated with the software program.

* * * * *

UNITED STATES PATENT AND TRADEMARK OFFICE
CERTIFICATE OF CORRECTION

| | |
|---|---|
| PATENT NO. | : 9,116,707 B2 |
| APPLICATION NO. | : 12/914499 |
| DATED | : August 25, 2015 |
| INVENTOR(S) | : Mark B. Reinhold et al. |

It is certified that error appears in the above-identified patent and that said Letters Patent is hereby corrected as shown below:

In the claims,
In claim 17 (at column 16, line 30), please delete the phrase "The computer-implemented 1" and replace it with the phrase --The computer-implemented method of claim 1--.

Signed and Sealed this
Twenty-ninth Day of December, 2015

Michelle K. Lee
*Director of the United States Patent and Trademark Office*